(12) United States Patent
Yamada

(10) Patent No.: US 7,908,142 B2
(45) Date of Patent: Mar. 15, 2011

(54) APPARATUS AND METHOD FOR IDENTIFYING PROSODY AND APPARATUS AND METHOD FOR RECOGNIZING SPEECH

(75) Inventor: Keiichi Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 965 days.

(21) Appl. No.: 11/805,371

(22) Filed: May 23, 2007

(65) Prior Publication Data

US 2007/0276659 A1    Nov. 29, 2007

(30) Foreign Application Priority Data

May 25, 2006  (JP) ................ P2006-145729

(51) Int. Cl.
*G10I 15/00* (2006.01)
(52) U.S. Cl. .............. 704/235; 704/251; 704/257
(58) Field of Classification Search .......... 704/235, 704/251, 257
See application file for complete search history.

(56) References Cited

U.S. PATENT DOCUMENTS

| | | | |
|---|---|---|---|
| 6,873,953 B1* | 3/2005 | Lennig | 704/253 |
| 7,283,958 B2* | 10/2007 | Azara et al. | 704/257 |
| 2005/0182619 A1* | 8/2005 | Azara et al. | 704/9 |
| 2005/0246165 A1* | 11/2005 | Pettinelli et al. | 704/207 |
| 2006/0122834 A1* | 6/2006 | Bennett | 704/256 |
| 2010/0036660 A1* | 2/2010 | Bennett | 704/231 |

FOREIGN PATENT DOCUMENTS

| | | |
|---|---|---|
| JP | 4-66999 | 3/1992 |
| JP | 8 22296 | 1/1996 |
| JP | 11 327600 | 11/1999 |
| JP | 2001 350488 | 12/2001 |
| JP | 2003 108199 | 4/2003 |
| JP | 2004 61567 | 2/2004 |
| JP | 2004 325936 | 11/2004 |
| JP | 2005 301097 | 10/2005 |

* cited by examiner

*Primary Examiner* — Daniel D Abebe
(74) *Attorney, Agent, or Firm* — Frommer Lawrence & Haug LLP; William S. Frommer; Thomas F. Presson

(57) ABSTRACT

A prosody identifying apparatus for identifying input speech on the basis of prosodic features of the input speech is provided. The prosody identifying apparatus includes a sound analyzing section for acquiring an amount of change in movement of a feature distribution obtained from an autocorrelation matrix of the frequency characteristic of the input speech and an identifying section for recognizing the input speech on the basis of an output of the sound analyzing section.

10 Claims, 13 Drawing Sheets

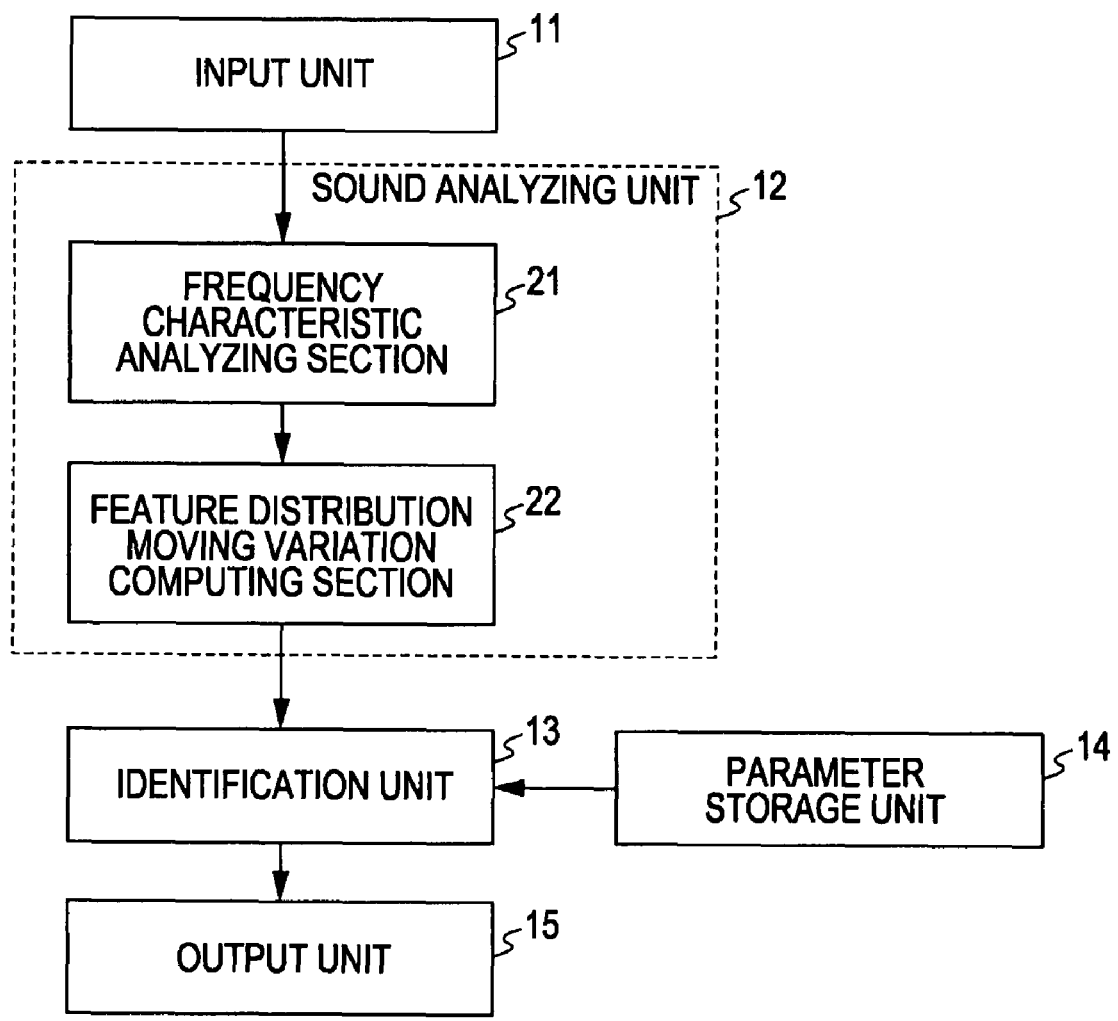

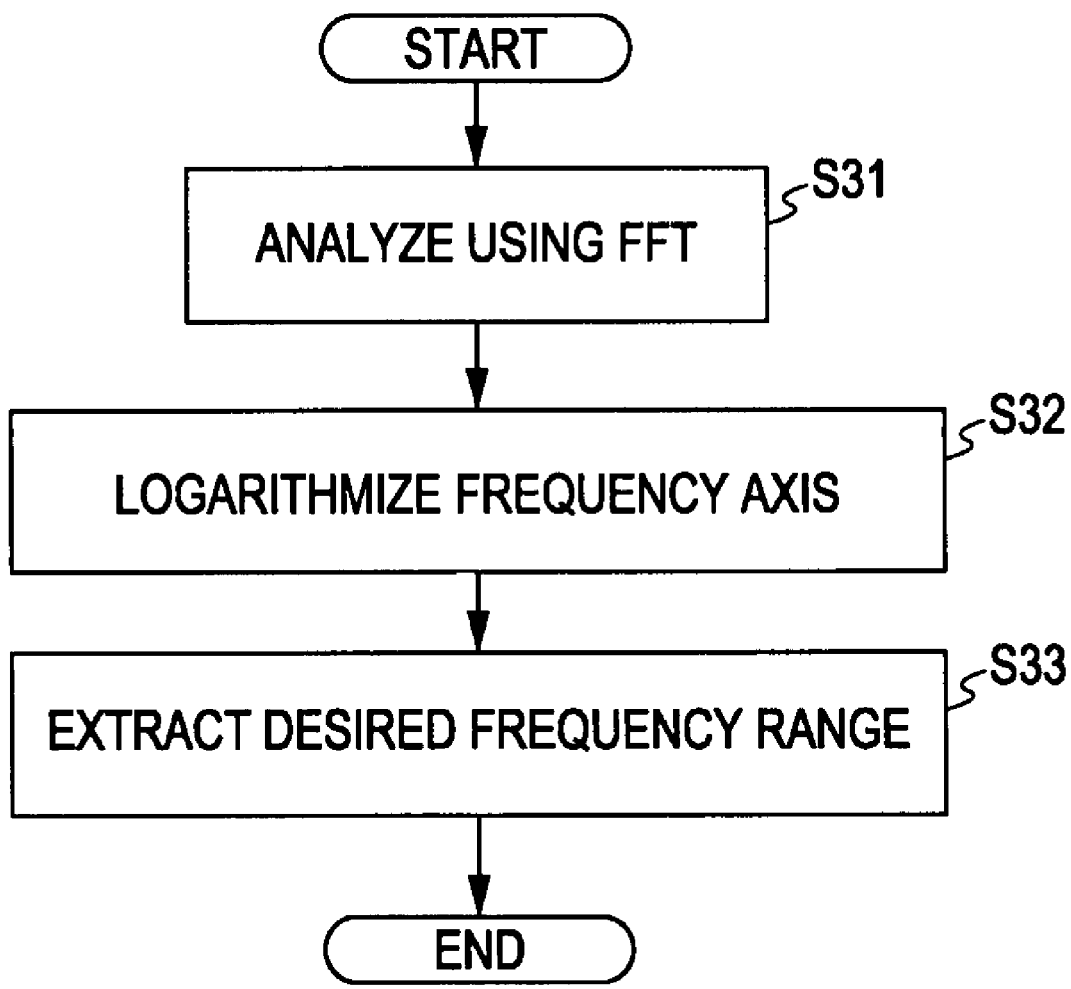

FIG. 6

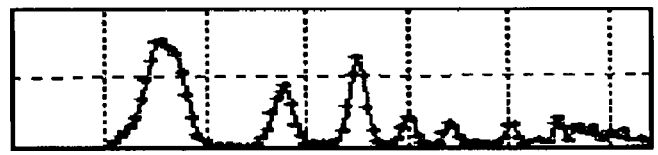
FREQUENCY CHARACTERISTIC

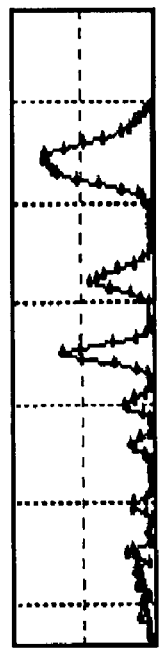

$$(\nu_1, \nu_2, \cdots \nu_j, \cdots \cdots \nu_N)$$

$$\begin{pmatrix} \nu_1 \\ \nu_2 \\ \vdots \\ \nu_i \\ \vdots \\ \nu_N \end{pmatrix} \begin{pmatrix} m_{11} & m_{12} & \cdots & \cdots & m_{1N} \\ m_{21} & m_{22} & & & m_{2N} \\ \vdots & & & & \\ m_{i1} & \cdots & & & \\ \vdots & & m_{(i-1+j)j} & & \\ m_{N1} & m_{N2} & \cdots & m_{N(N-(i-1))} & \cdots & m_{NN} \end{pmatrix}$$

VECTOR Di
( iTH-ORDER COMPONENTS OF LOWER TRIANGULAR MATRIX IN DIAGONAL DIRECTION )

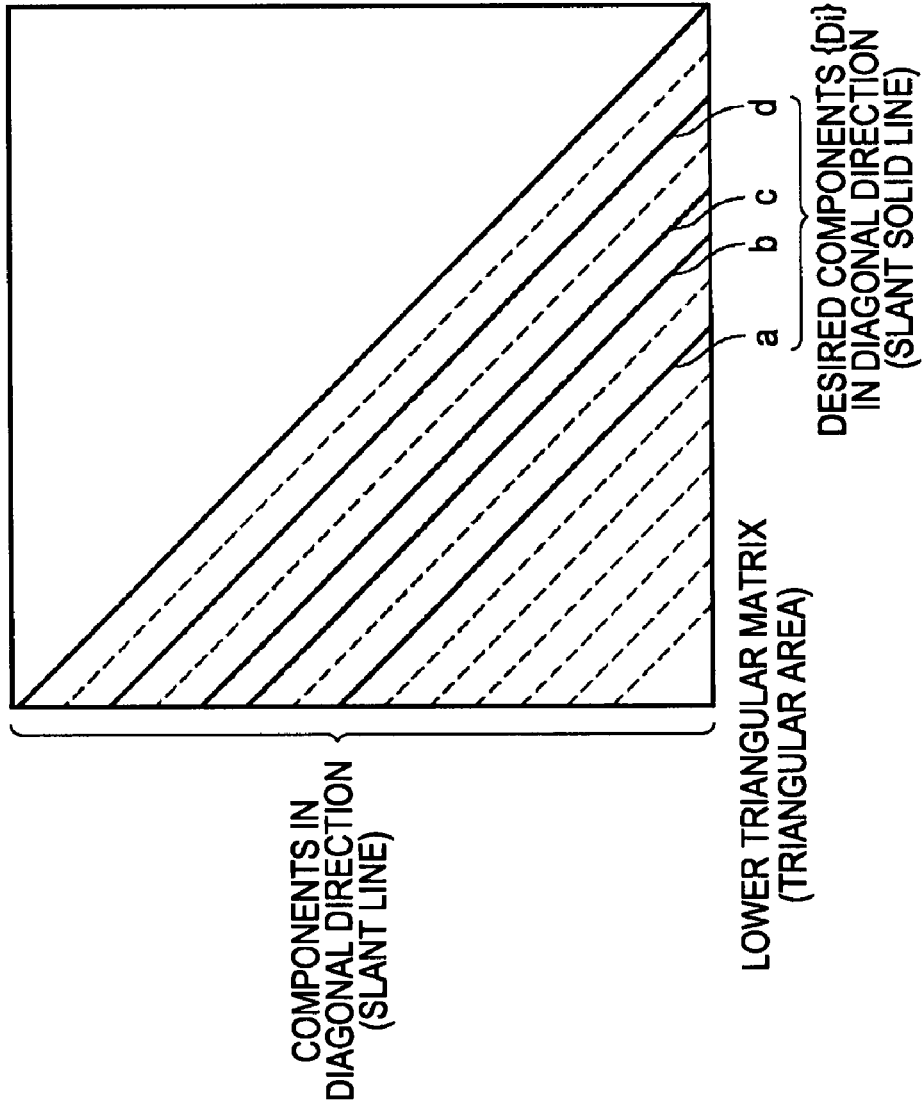

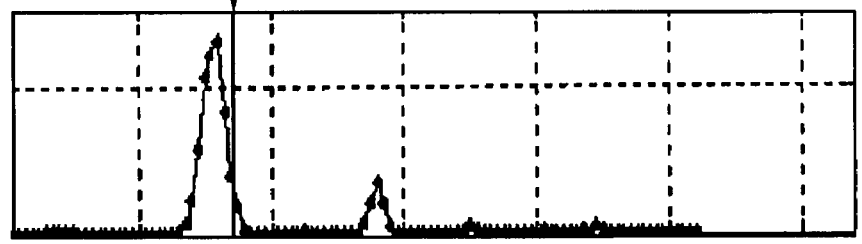
FIG. 9A  COMPONENT VECTOR WHEN LOGARITHMIC FREQUENCY = 2
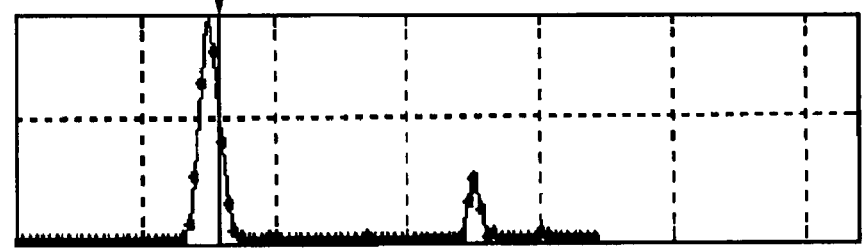
FIG. 9B  COMPONENT VECTOR WHEN LOGARITHMIC FREQUENCY = 3
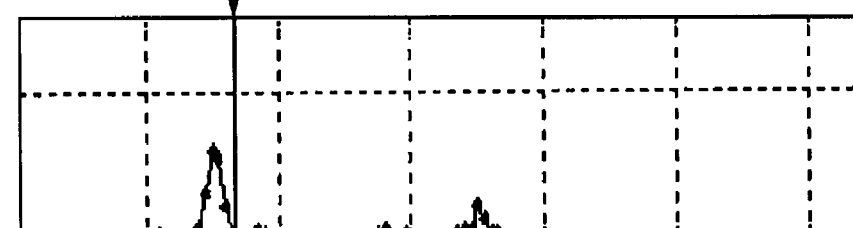
FIG. 9C  COMPONENT VECTOR WHEN LOGARITHMIC FREQUENCY = 4

FIG. 10A
SPEECH WAVES
(ENLARGED PORTION)

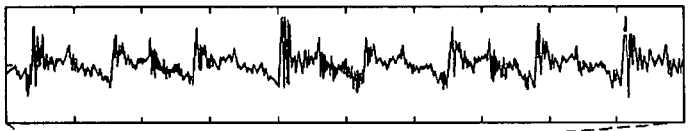

FIG. 10B
SPEECH WAVES

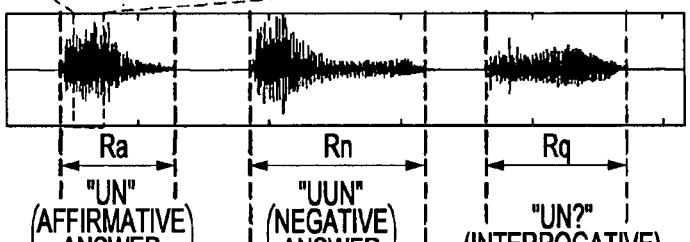

FIG. 10C
SPECTROGRAM

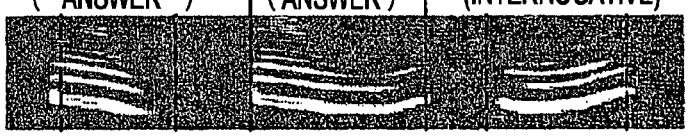

FIG. 10D
MEDIAN POINT OF
FEATURE DISTRIBUTION
(LOGARITHMIC FREQUENCY=2)

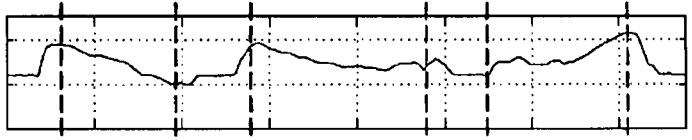

FIG. 10E
MEDIAN POINT OF
FEATURE DISTRIBUTION
(LOGARITHMIC FREQUENCY=3)

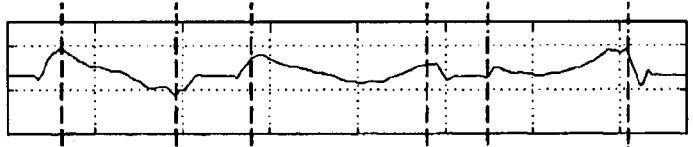

FIG. 10F
MEDIAN POINT OF
FEATURE DISTRIBUTION
(LOGARITHMIC FREQUENCY=4)

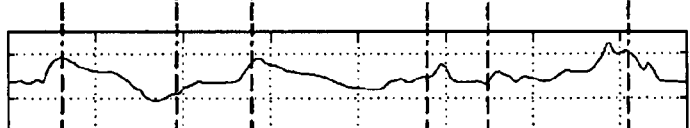

FIG. 10G
TIME DIFFERENCE
BETWEEN MEDIAN POINTS
(LOGARITHMIC FREQUENCY=2)

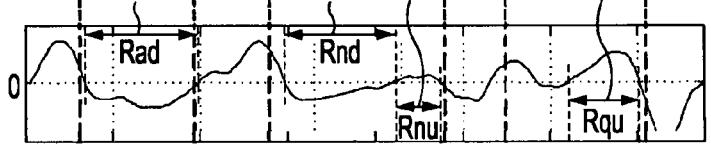

FIG. 10H
TIME DIFFERENCE
BETWEEN MEDIAN POINTS
(LOGARITHMIC FREQUENCY=3)

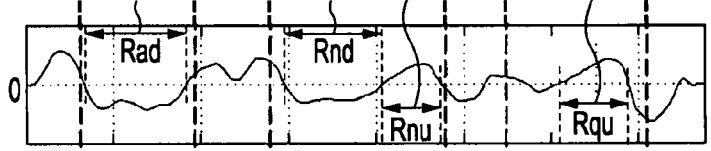

FIG. 10I
TIME DIFFERENCE
BETWEEN MEDIAN POINTS
(LOGARITHMIC FREQUENCY=4)

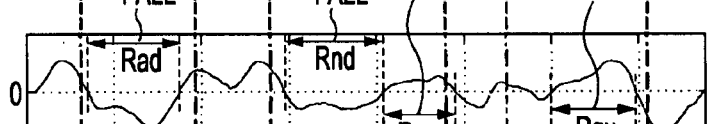

FIG. 11A
SPEECH WAVES
(ENLARGED PORTION)
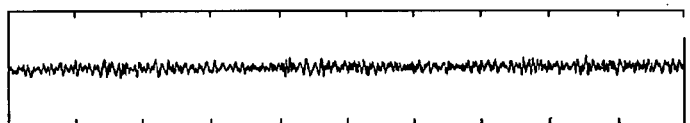

FIG. 11B
SPEECH WAVES
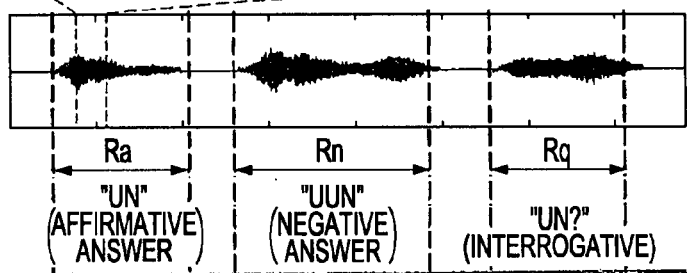

FIG. 11C
SPECTROGRAM
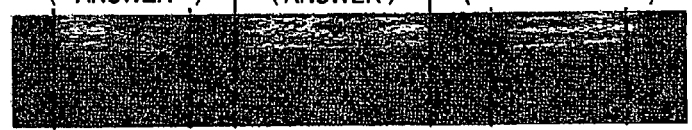

FIG. 11D
MEDIAN POINT OF
FEATURE DISTRIBUTION
(LOGARITHMIC FREQUENCY=2)
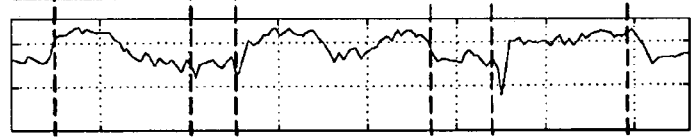

FIG. 11E
MEDIAN POINT OF
FEATURE DISTRIBUTION
(LOGARITHMIC FREQUENCY=3)

FIG. 11F
MEDIAN POINT OF
FEATURE DISTRIBUTION
(LOGARITHMIC FREQUENCY=4)

FIG. 11G
TIME DIFFERENCE
BETWEEN MEDIAN POINTS
(LOGARITHMIC FREQUENCY=2)

FIG. 11H
TIME DIFFERENCE
BETWEEN MEDIAN POINTS
(LOGARITHMIC FREQUENCY=3)
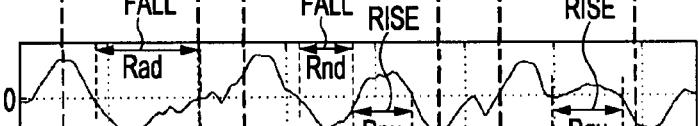

FIG. 11I
TIME DIFFERENCE
BETWEEN MEDIAN POINTS
(LOGARITHMIC FREQUENCY=4)
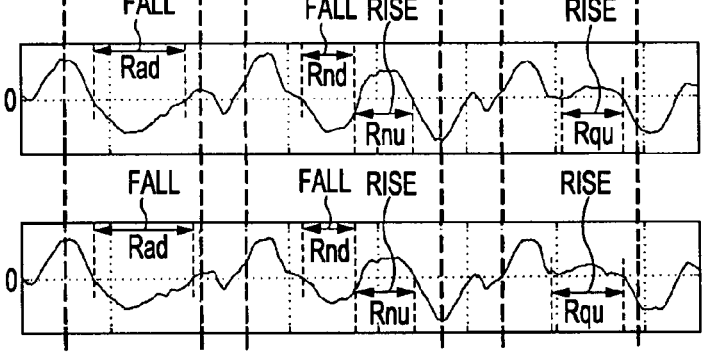
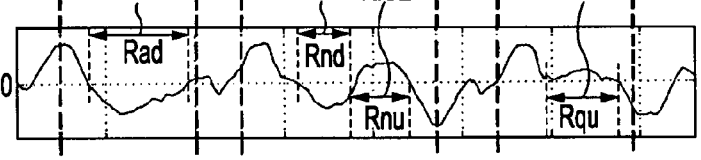

"UN" that indicates an affirmative answer is pho-
APPARATUS AND METHOD FOR IDENTIFYING PROSODY AND APPARATUS AND METHOD FOR RECOGNIZING SPEECH

CROSS REFERENCES TO RELATED APPLICATIONS

The present invention contains subject matter related to Japanese Patent Application JP 2006-145729 filed in the Japanese Patent Office on May 25, 2006, the entire contents of which are incorporated herein by reference.

BACKGROUND OF THE INVENTION

1. Field of the Invention

The present invention relates to an apparatus and a method for identifying prosody and an apparatus and a method for recognizing speech. More particularly, the present invention relates to an apparatus and a method for identifying prosody on the basis of features of input speech and an apparatus and a method for recognizing speech using the prosody identification.

2. Description of the Related Art

In recent years, use of speech recognition technologies has become widespread. In known speech recognition technologies, information about phonemes (hereinafter referred to as "phoneme information") contained in speech among other information is recognized. In widely used speech recognition technologies, information about prosody (hereinafter referred to as "prosody information"), which is one kind of information contained in speech other than phonemes, is not actively utilized.

However, some known technologies utilize prosody information. For example, a technology described in Japanese Unexamined Patent Application Publication No. 04-66999 utilizes prosody information in order to more appropriately determine the position of a border between phonetic syllables. However, in this technology, the prosody information is utilized as supplementary information to improve the accuracy of the speech recognition. That is, a variety of information items contained in the prosody information is not explicitly identified.

SUMMARY OF THE INVENTION

In some cases, human utterance speech cannot be identified by using phonetic information. For example, in Japanese language, "UN" that indicates an affirmative answer is phonetically similar to "UUN" that indicates a negative answer. In such a case, the affirmative answer cannot be distinguished from the negative answer using only the phonetic information contained in an utterance. Accordingly, the utterance needs be identified on the basis of prosody information, for example, an intonation pattern and a phoneme duration.

In speech signal processing, a process related to intonation recognition is generally performed by detecting a pitch frequency (or a pitch cycle). However, when a pitch frequency is detected, an error tends to occur due to an effect of noise. In addition, when a pitch frequency is detected from a quiet voice or a voice having small pitch features, an error tends to occur. In such a situation in which a detection error of a pitch frequency tends to occur or for an utterance that easily causes a detection error, it is difficult to apply an identification method using prosody information.

Accordingly, the present invention provides an apparatus and a method for identifying prosody and an apparatus and a method for recognizing speech capable of effectively detecting a pitch frequency even when a voice that is adversely effected by noise, a quiet voice, or a voice having small pitch features is input and reliably recognizing the input voice on the basis of prosodic features.

According to an embodiment of the present invention, a prosody identifying apparatus identifies input speech using an amount of change in movement of a feature distribution obtained from the frequency characteristic of the input speech without detecting a pitch frequency. In addition, a desired components of an autocorrelation matrix of the frequency characteristic of the input speech in a diagonal direction are used as the feature distribution.

That is, according to the embodiment of the present invention, to address the above-described problem, when identifying input speech on the basis of prosodic features of the input speech, the prosody identifying apparatus identifies the input speech using an amount of change in movement of a feature distribution obtained from an autocorrelation matrix of the frequency characteristic of the input speech.

Here, a time difference between median points of the feature distribution can be utilized as the amount of change in movement of the feature distribution. In addition, a desired components of an autocorrelation matrix of the frequency characteristic of the input speech in a diagonal direction can be used as the feature distribution.

According to another embodiment of the present invention, a speech recognition apparatus includes inputting means for inputting a speech signal, prosody identifying means for identifying prosody on the basis of an amount of change in movement of a feature distribution obtained from an autocorrelation matrix of a frequency characteristic of the input speech input to the inputting means, and speech recognizing means for performing speech recognition on the basis of features acquired by sound-analyzing the speech input to the inputting means, and selecting means for selecting whether to output an output of the speech recognizing means or to integrate the output from the prosody identifying means with an output of the speech recognizing means and output the integrated output. Subsequently, the selecting means outputs the selected output.

According to the above-described embodiments of the present invention, when identifying input speech on the basis of prosodic features of the input speech, the prosody identifying apparatus and the speech recognition apparatus identify the input speech using an amount of change in movement of a feature distribution obtained from the frequency characteristic of the input speech. Accordingly, even when a voice that is adversely effected by noise, a quiet voice, or a voice having small pitch features is input, the input voice can be identified using a more robust approach than in the known methods.

BRIEF DESCRIPTION OF THE DRAWINGS

FIG. 1 is a block diagram illustrating an exemplary system configuration of a prosody identifying apparatus according to an embodiment of the present invention;

FIG. 3 is a flow chart illustrating frequency characteristic analysis.

FIG. 6 illustrates an autocorrelation matrix of a frequency characteristic;

FIG. 7 illustrates components of the autocorrelation matrix of a frequency characteristic in a diagonal direction;

FIGS. 9A-9C illustrate feature distributions of vectors corresponding to three orders of components of the autocorrelation matrix of a frequency characteristic in the diagonal direction;

FIGS. 10A-10I illustrate a change over time in an order of the median point of a feature distribution and a change over time in a time difference between the orders of the median point in the case of an ordinary voice according to the embodiment;

FIGS. 11A-11I illustrate a change over time in an order of the median point of a feature distribution and a change over time in a time difference between the orders of the median point in the case of a quiet voice according to the embodiment;

DESCRIPTION OF THE PREFERRED EMBODIMENTS

Figure 2A:
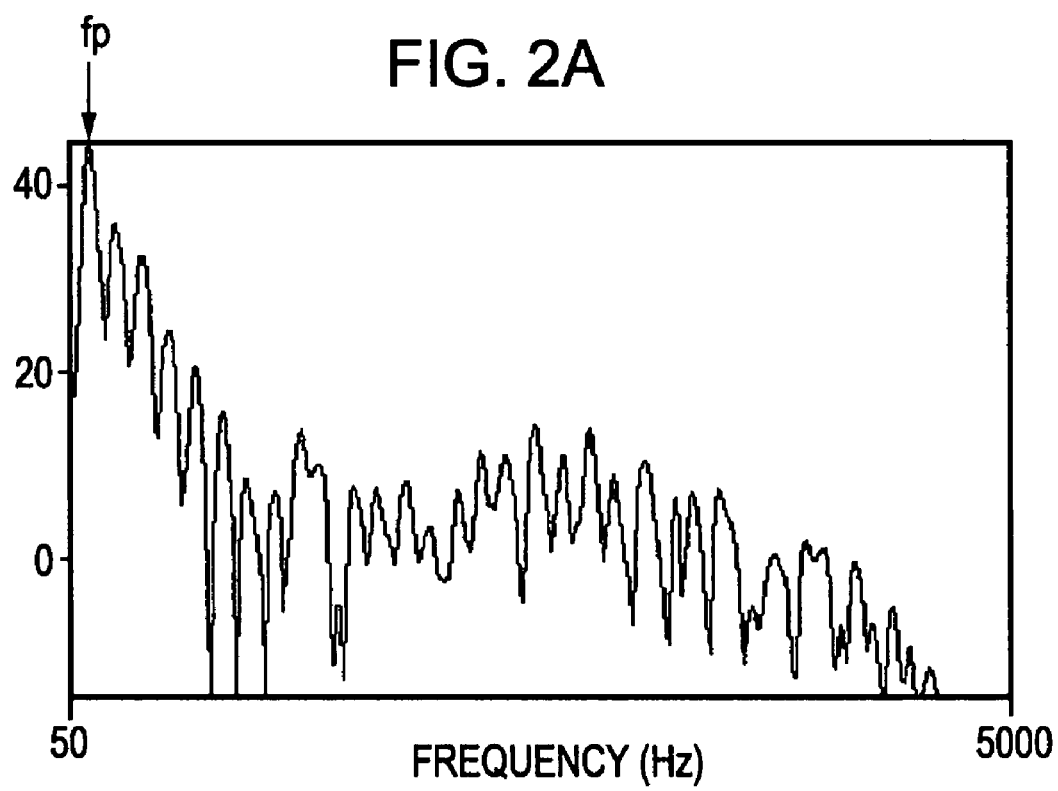
FIG. 2A illustrates an example of a frequency characteristic of an ordinary voice.

Exemplary embodiments of the present invention are described in detail below with reference to the accompanying drawings.

An exemplary system configuration and the entire process flow of a prosody identifying apparatus are described first. Thereafter, the internal process performed by a sound analyzing unit of the prosody identifying apparatus is described in detail. Subsequently, an exemplary system configuration is described in detail when the prosody identifying apparatus according to an embodiment of the present invention is used together with a widely used speech recognition apparatus.

Speech Recognition

FIG. 1 is a block diagram illustrating an exemplary system configuration of a prosody identifying apparatus according to an embodiment of the present invention. Basically, the system configuration of the prosody identifying apparatus is similar to that of a widely used speech recognition apparatus. As shown in FIG. 1, the prosody identifying apparatus includes an input unit 11, a sound analyzing unit 12, an identification unit 13, and an output unit 15.

The input unit 11 includes a device for inputting a sound signal (e.g., a microphone), an amplifier for amplifying the input signal, and an analog-to-digital (A/D) converter for converting the amplified signal to a digital signal. The input unit 11 samples the input signal, for example, at 16 kHz sampling rate, and delivers the sampled signal to the sound analyzing unit 12.

The sound analyzing unit 12 retrieves features required for recognition from the input speech signal. Thereafter, the sound analyzing unit 12 delivers the retrieved features to the identification unit 13. The internal process performed by the sound analyzing unit 12 according to the present embodiment will be described later.

The identification unit 13 performs a recognition process of the unknown speech data using parameters stored in a parameter storage unit 14. The parameters stored in a parameter storage unit 14 are generated on the basis of features obtained by sound-analyzing learning speech data in advance.

As used herein, the term "recognition process of the unknown speech data" refers to a process for selecting prosody identification units in accordance with the input from a given prosody-identification-unit dictionary. Examples of the typical recognition methods include a dynamic programming (DP) matching method, a neural network method, and a hidden Markov model (HMM) method.

In the method using the DP matching, standard patterns known as templates are found as a parameter from the features obtained by analyzing speech signals in advance. By comparing the templates with the features of the unknown speech, the template that is the most closest to the features is found. To compensate for variation in the utterance speed, a technique called "dynamic time warping" is widely used. In this technique, the time axis is shrunk or stretched so that the distortion between the features and the template is minimized.

In the method using a neural network, recognition is made using a network model that simulates the structure of a human brain. In a learning step, a weighting coefficient for each of paths is determined as a parameter in advance. A distance between the output obtained by inputting the features of the unknown speech to the network and each of the prosody identification units in the prosody-identification-unit dictionary is computed so that the prosody identification unit corresponding to the input speech signal is determined.

In the method using the HMM, recognition is made using a probability model. Transition probability and output symbol probability are determined for a state transition model on the basis of learning data in advance. Using the occurrence probability of each of the models for the features of the unknown speech, a prosody identification unit corresponding to the input speech is determined.

As noted above, in general, the recognition process performed in the identification unit 13 includes a learning step and a recognition step. In the learning step, a parameter determined by learning data, that is, a template, a weighting coefficient of a network model, or a statistic parameter of a probability model, is obtained and stored in the parameter storage unit 14. Subsequently, in the recognition step, the input unknown speech signal is sound-analyzed. Thereafter, a score based on a distance or an occurrence probability, depending on the recognition method, is assigned to each of the prosody identification units in a given prosody-identification-unit dictionary. Thus, the prosody identification unit having the highest score or a plurality of the prosody identification units having the highest scores from the top are selected as a recognition result.

The identification unit 13 delivers such a recognition result to the output unit 15.

The output unit 15 displays the delivered recognition result on a screen, outputs the recognition result in the form of sound, or instructs a different unit to operate in accordance with the recognition result.

In the known methods, to detect a pitch frequency, it is assumed that a time duration of a pitch cycle, which is a cycle of the vibration of the vocal cords in an utterance, (or a pitch frequency, which is the inverse of the pitch cycle) is uniquely determined. The process of uniquely determining the pitch frequency is a process of finding the center frequency of a peak component that is present in the lowest frequency range in the frequency characteristic distribution corresponding to an utterance. For example, in the case of a frequency characteristic of an ordinary voice shown in FIG. 2A, a frequency fp represents the pitch frequency.

Figure 2B:
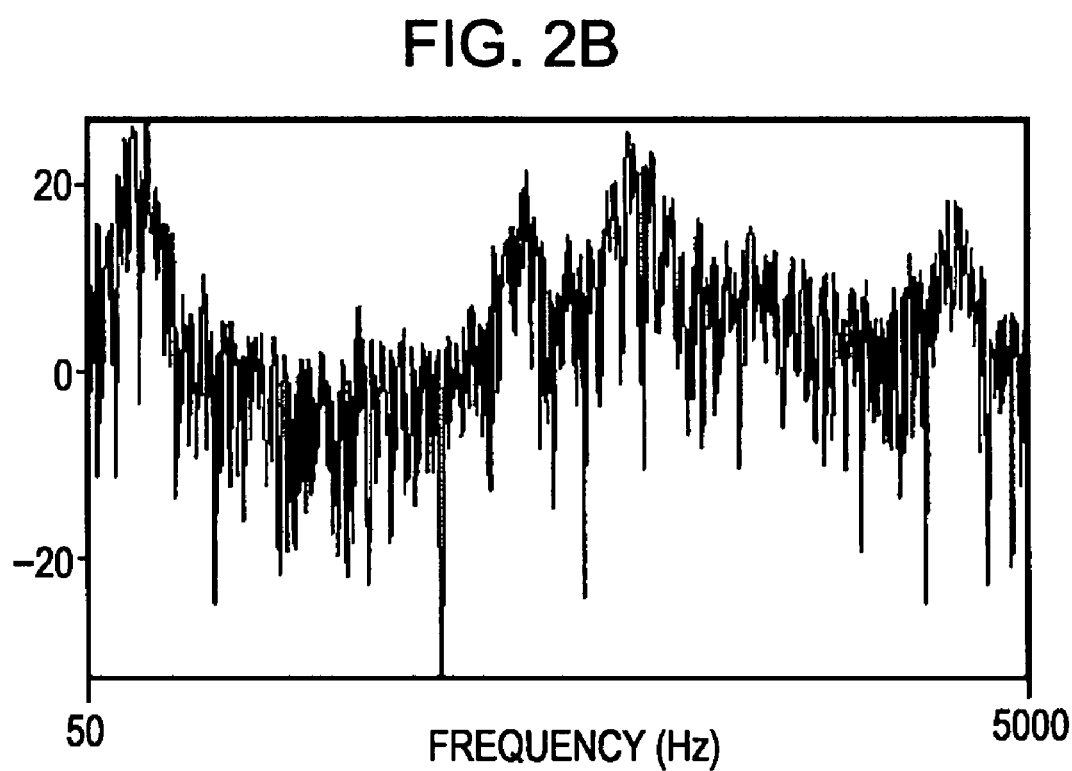
FIG. 2B illustrates an example of a frequency characteristic of a quiet voice.

However, if the utterance contains noise or the utterance is made by a quiet voice having small pitch features and the known methods are used, it is difficult to perform the process of determining the pitch frequency. For example, in the case of a quiet voice shown in FIG. 2B, it is difficult to detect the center frequency of a peak component that is present in the lowest frequency range. This is because the determination of the pitch frequency depends on the peaks of the frequency characteristic.

In contrast, in the prosody identifying apparatus according to the present embodiment, the prosody identifying apparatus uses an amount of change in movement of a feature distribution. Thus, the prosody identifying apparatus does not require the process of uniquely determining the appropriate pitch frequency that depends on the peaks of the frequency characteristic. Consequently, even when it is difficult to detect the pitch frequency, the prosody identifying apparatus can detect a change in intonation using a more robust approach than in the known methods.

Additionally, in the known methods of detecting a pitch frequency, the frequency characteristic corresponding to an utterance is considered to be a feature distribution. Then, desired features (pitch frequency) are extracted from the distribution. According to the present embodiment, by using desired components of an autocorrelation matrix in the diagonal direction, a change in movement of the frequency characteristic can be obtained from a plurality of feature distributions. Thus, the change in intonation in the utterance can be appropriately obtained.

Such a key feature of the embodiment of the present invention is mainly provided by the sound analyzing unit 12 shown in FIG. 1. The exemplary configuration and operations of the sound analyzing unit 12 are described in detail below.

Internal Process of Sound Analyzing Unit

According to the present embodiment, as shown in FIG. 1, the sound analyzing unit 12 includes a frequency characteristic analyzing section 21 and a feature distribution moving variation computing section 22.

The frequency characteristic analyzing section 21 converts an input speech signal to a frequency characteristic. The process performed by the frequency characteristic analyzing section 21 is described in detail next with reference to a flow chart shown in FIG. 3.

Figure 4A:
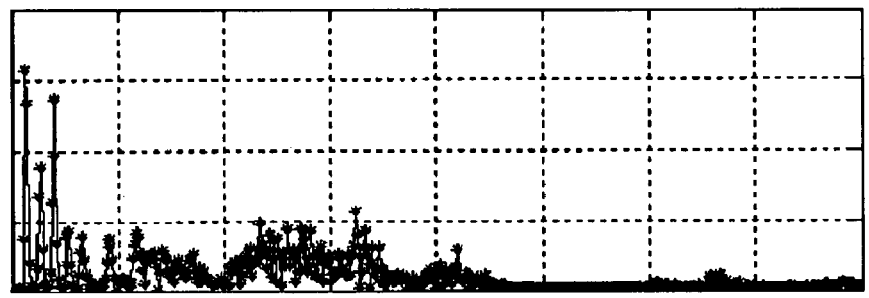
FIGS. 4A-4C are graphs illustrating processes performed by a frequency characteristic analyzing section according to an embodiment of the present invention.

As shown in FIG. 3, at step S31, the input speech signal is converted to a frequency domain by means of a time-frequency transform process, such as Fast Fourier Transform (FFT) analysis. Thus, a general characteristic is acquired. An example of the frequency characteristic is shown in FIG. 4A.

Figure 4B:
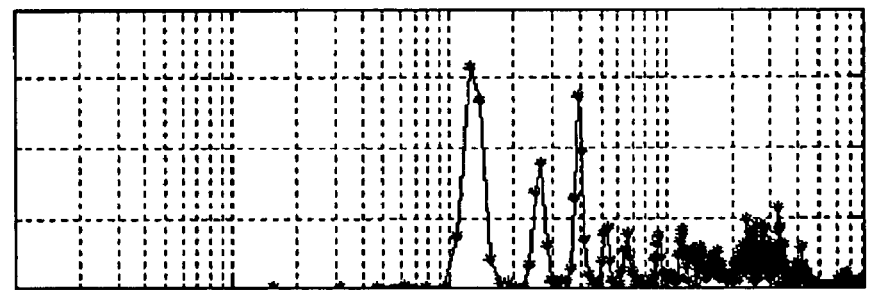

Subsequently, the processing proceeds to step S32, where the frequency axis of the general frequency characteristic is logarithmized so that a frequency characteristic on a logarithmic frequency scale is obtained. An example of the frequency characteristic on a logarithmic frequency scale is shown in FIG. 4B.

Figure 4C:
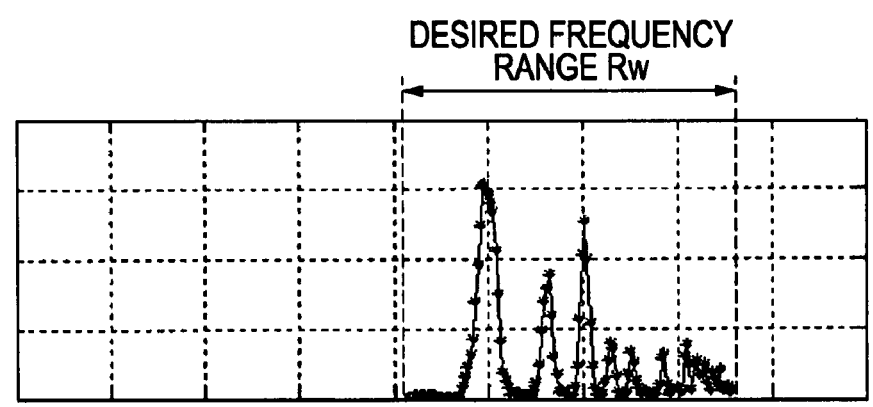

Subsequently, the processing proceeds to step S33, where only a desired frequency range is extracted from the frequency characteristic on a logarithmic frequency scale. This result is output as the result of the frequency characteristic analyzing section 21. FIG. 4C illustrates the frequency characteristic of only a desired frequency range Rw retrieved from the frequency characteristic shown in FIG. 4B.

The frequency characteristic, as shown in FIG. 4C, which is the above-described result of analysis performed by the frequency characteristic analyzing section 21, is delivered to the feature distribution moving variation computing section 22.

The process flow of the feature distribution moving variation computing section 22 is described in detail next with reference to a flow chart shown in FIG. 5.

At step S41, the feature distribution moving variation computing section 22 computes an autocorrelation matrix of a frequency characteristic using the delivered frequency characteristic.

Here, the frequency characteristic delivered from the frequency characteristic analyzing section 21 is expressed in the form of a column vector V of size N. The column vector V is given by the following expression:

$$V = (v_1, v_2, \ldots, v_i, \ldots, v_j, \ldots, v_n)^T \quad (1)$$

At that time, an autocorrelation matrix M is expressed as a product of the vector V and a transposed matrix V' as follows:

$$M = V \cdot V^T \quad (2)$$

FIG. 6 illustrates the autocorrelation matrix M given by equation (2).

In a lower triangular matrix L (a lower left triangular section of FIG. 7) of the autocorrelation matrix M, the ith-order components of the lower triangular matrix L in the diagonal direction form a vector formed from the products of (i−1+j)th-order coefficient and the jth-order coefficient of the vector V, where $1 \leq i \leq N$ and $1 \leq j \leq (N-(i-1))$.

Let a vector $D_i$ denote the ith-order components of the lower triangular matrix L in the diagonal direction. Then, $D_i$ is expressed as follows:

$$D_i = (m_{i1}, \ldots, m_{(i-1+j)j}, \ldots, m_{N(N-(i-1))})^T \quad (3)$$
$$= (v_i \cdot v_1, \ldots, v_{(i-1+j)} \cdot v_j, \ldots, v_N \cdot v_{(N-(i-1))})^T$$

Since the vector V represents the frequency characteristic on a logarithmic frequency scale, the vector $D_i$ indicates a relationship between any frequency (in the frequency range of the frequency characteristic) and a frequency being an integer multiple of the frequency (i.e., a frequency distant from the frequency by (i−1) orders on the logarithmic frequency scale). A vector D1 formed from the first-order components of the lower triangular matrix L (i.e., the main diagonal components) represents a vector formed from the squares of the amplitudes of frequency components of the frequency characteristic (i.e., the power spectrum).

Figure 5:
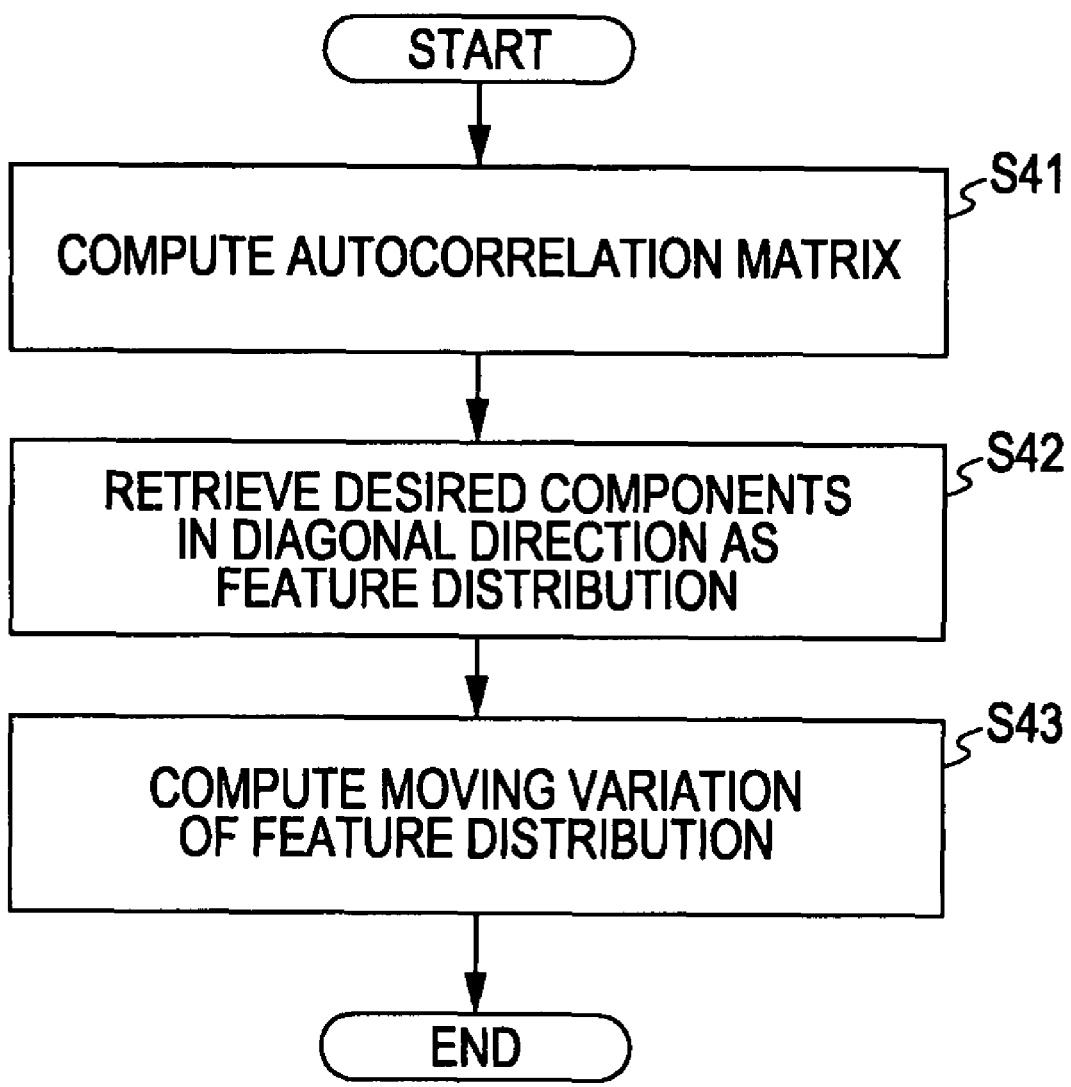
FIG. 5 is a flow chart illustrating a process performed by a feature distribution moving variation computing section according to the embodiment of the present invention.

After computing the autocorrelation matrix M of the frequency characteristic, the processing proceeds to step S42 shown in FIG. 5. At step S42, a desired diagonal-component vector $D_i$ is retrieved from the lower triangular matrix L of the autocorrelation matrix M, where i denotes any number between 1 and N. These diagonal-component vectors $D_i$ are defined as feature distributions for identification.

When the entire feature distributions are defined as a set D of the vectors $D_i$, the set D is expressed as follows:

$$D = \{D_i\} \quad (4)$$

where i denotes any number between 1 and N.

The entire feature distributions, that is, the set of desired component vectors $D_i$ in the diagonal direction is schematically shown in FIG. 7. In FIG. 7, diagonal solid lines (solid lines slanting down to the right) a to d represent the desired component vectors $D_i$.

Figure 8:
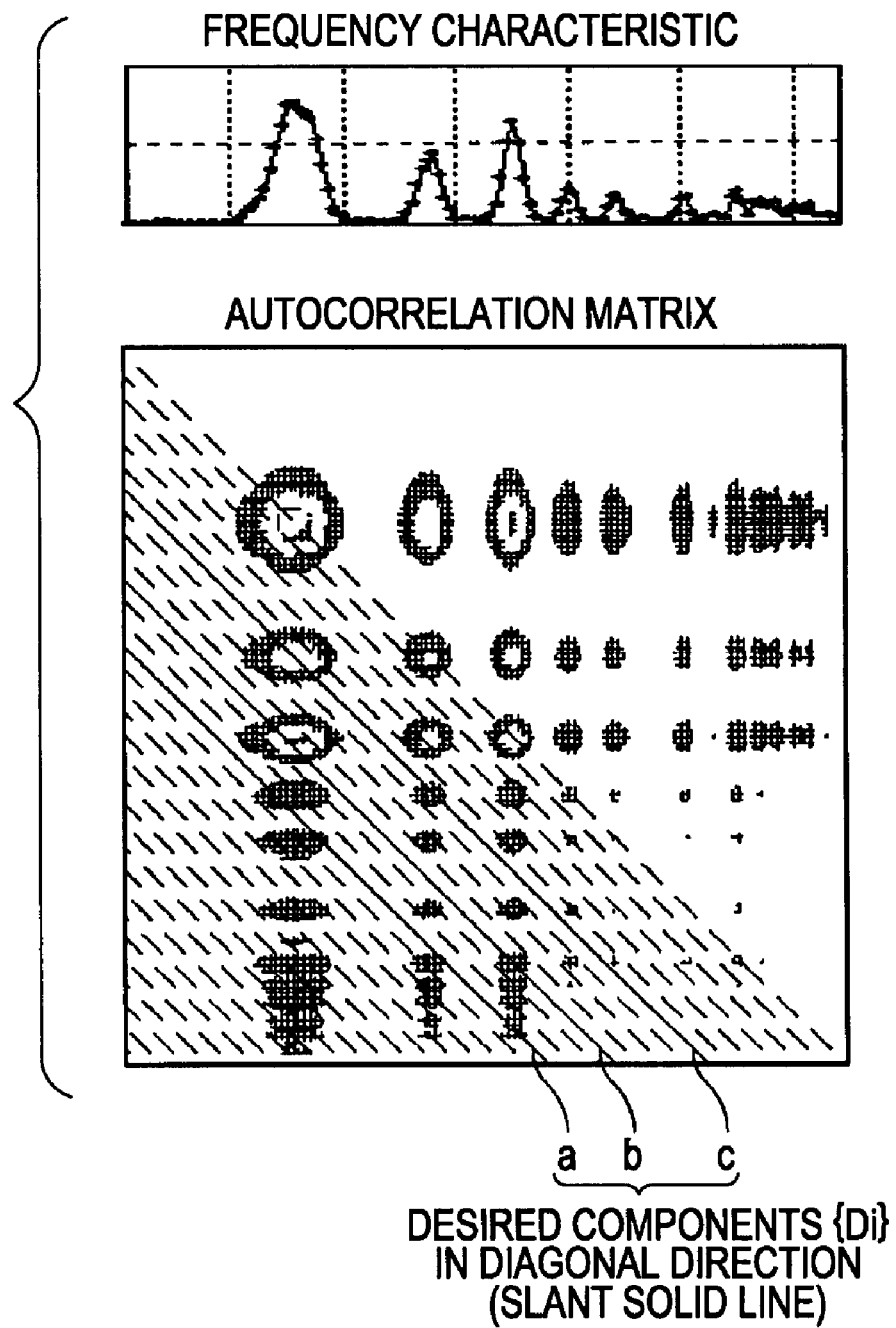
FIG. 8 is a diagram illustrating a graph of the autocorrelation matrix of a frequency characteristic and components of the autocorrelation matrix in a diagonal direction.

An example of such a feature distribution is illustrated in FIG. 8 and FIGS. 9A to 9C. In FIG. 8, the vectors a to c are selected. The orders of the vectors a to c correspond to a frequency to the power of two, a frequency to the power of three, and a frequency to the power of four, respectively. That is, on the logarithmic frequency scale, the logarithmic frequencies corresponding to the ith orders are log (2), log (3), and log (4). The feature distributions of these component vectors a to c are illustrated in FIGS. 9A to 9C, respectively. That is, FIGS. 9A to 9C illustrate the feature distributions of component vectors having logarithmic frequencies of 2, 3, and 4, respectively.

To determine the order number i of the desired component vector $D_i$ in the diagonal direction, the identification accuracy in the learning step performed by the above-described identification unit can be used as a reference. That is, the order of the desired component vector can be determined so as to be the order (or a combination of the orders) that provides excellent identification accuracy in the learning step performed by the identification unit 13.

Subsequently, the processing proceeds to step S43 shown in FIG. 5. At step S43, an amount of change in movement of each of the feature distributions with time is computed.

To compute an amount of change in movement of a feature distribution, a method in which the median point of the feature distribution is computed first, and subsequently, a time difference between processing frames is computed can be used. The order $C_i$ corresponding to the median point of each of the feature distributions is given by the following equation:

$$c_i = \frac{\sum_{k=1}^{N-(i-1)} k \cdot m_{ik}}{\sum_{k=1}^{N-(i-1)} m_{ik}} \quad (5)$$

In FIGS. 9A, 9B, and 9C, the orders corresponding to the median points of the feature distributions are indicated by arrows Ca, Cb, and Cc, respectively.

Subsequently, a time difference between processing frames is computed using the order corresponding to the median point of each of the feature distributions obtained by using equation (5). To compute the time difference, a method for computing a difference between sound parameters, which is widely used in speech recognition technology, can be used. Examples of the computational expression for computing the time difference are given as follows:

$$d_{it} = \frac{\sum_{\theta=1}^{\Theta} \theta \cdot (c_{i(t+\theta)} - c_{i(t-\theta)})}{2 \cdot \sum_{\theta=1}^{\Theta} \theta^2} \quad (6)$$

$$d_{it} = \frac{(c_{i(t+\theta)} - c_{i(t-\theta)})}{2 \cdot \Theta} \quad (7)$$

In equations (6) and (7), $\Theta$ denotes the number of frames (a window width) for computing the time difference. The time difference computed using equation (6) or (7) is delivered to the identification unit 13 as a parameter. Thereafter, the above-described speech recognition process is performed.

A change in the order corresponding to the median point of each feature distribution over time and a change in the time subtraction of the order corresponding to the median point over time are described next. In examples illustrated in FIGS. 10A to 10I and FIGS. 11A to 11I, a region Ra denotes an utterance "UN" that indicates an affirmative answer, a region Rn denotes an utterance "UUN" that indicates a negative answer, and a region Rq denotes an utterance "UN?" that indicates an interrogative.

In the example illustrated in FIGS. 10A to 10I, three utterances "UN" that indicates an affirmative answer (the region Ra), utterance "UUN" that indicates a negative answer (the region Rn), and "UN?" that indicates an interrogative (the region Rq) are input using a normal voice (voice having pitch features) so that a variety of parameters are acquired.

FIG. 10B illustrates speech wave data of the entire utterance. FIG. 10A is a diagram of part of the speech wave data shown in FIG. 10B enlarged along the time axis. FIG. 10A indicates that the input utterance is a sound having pitch features.

FIG. 10C illustrates the spectrograms corresponding to the speech waves shown in FIG. 10B. FIG. 10C also indicates that the input utterance is a sound having pitch features.

FIGS. 10D to 10F illustrate changes over time in the orders corresponding to the median points of the above-described feature distributions. FIGS. 10D, 10E, and 10F correspond to the component vectors having the logarithmic frequencies of 2, 3, and 4, respectively.

FIGS. 10G, 10H, and 10I illustrate changes over time in the time differences of the orders corresponding to the median points computed from FIGS. 10D, 10E, and 10F, respectively. The final identification parameters delivered to the identification unit 13 of FIG. 1 are shown in FIGS. 10G, 10H, and 10I.

In FIGS. 10G, 10H, and 10I, the center point of the ordinate of the graph represents the origin of zero. A part having a positive time change in the order corresponding to the median point indicates that the pitch of the voice is increasing. In contrast, a part having a negative time change in the order corresponding to the median point indicates that the pitch of the voice is decreasing. As shown in FIGS. 10G, 10H, and 10I, the three types of utterances indicating an affirmative answer, a negative answer, and an interrogative exhibit different rising and falling of the voice pitch.

That is, as shown in FIGS. 10G, 10H, and 10I, in the utterance "UN" that indicates an affirmative answer (the region Ra), a falling part Rad primarily appears. In the utterance "UUN" that indicates a negative answer (the region Rn), a falling part Rnd appears first, and subsequently, a rising part Rnu appears. In the utterance "UN?" that indicates an interrogative (the region Rq), a rising part Rqu primarily appears. That is, in these graphs, the appearances of the rising part and falling part of the pitch of the voice are different. In this way, the differences among the utterances "UN" indicating an affirmative answer, "UUN" indicating a negative answer, and "UN?" indicating an interrogative can be distinguished.

Although, in FIGS. 10G, 10H, and 10I, changes over time in the time difference between the orders corresponding to the median points have substantially the same trend, the degrees of rising and falling are different due to the difference in the logarithmic frequency.

Note that, in the known method for detecting a pitch frequency, since the time difference between pitch frequencies is the same as the above-described time difference between the orders corresponding to the median points, the change over time is one parameter. However, according to the present embodiment, a plurality of time differences between the orders corresponding to the median points can be used by using desired component vectors. Accordingly, the changes in the features can be obtained in a variety of ways. Thus, a change in rising and falling of the pitch of voice that is difficult to detect in the known method can be reliably detected.

FIGS. 11A to 11I illustrate the computational results acquired in the same manner as in FIGS. 10A to 10I when a quiet voice is input. Graphs in FIGS. 11A to 11I correspond to the graphs in FIGS. 10A to 10I, respectively.

In FIGS. 10A to 10I, the input voice is an ordinary utterance. In the voice area, the periodicity of the vibration of the vocal cords for sonant appears. In contrast, in FIGS. 11A to 11I, a quiet voice is input as an input sound. In FIGS. 11A to 11C, pitch features of sufficient size does not appear. Thus, it is very difficult to detect the pitch frequency.

However, as shown in FIGS. 11G, 11H, and 11I, even when a quiet voice is input, a rise and a fall of the pitch of the voice can be sufficiently detected by using the method according to the present embodiment.

That is, like the cases shown in FIGS. 10G, 10H, and 10I, in the cases shown in FIGS. 11G, 11H, and 11I, in the utterance "UN" that indicates an affirmative answer (the region Ra), a falling part Rad primarily appears. In the utterance "UUN" that indicates a negative answer (the region Rn), a falling part Rnd appears first, and subsequently, a rising part Rnu appears. In the utterance "UN?" that indicates an interrogative (the region Rq), a rising part Rqu primarily appears.

Accordingly, even when a quiet voice is input, the differences among the utterances "UN" indicating an affirmative answer, a negative answer "UUN", and an interrogative "UN?" can be distinguished. In addition, even when noise is mixed with the utterance, a rise and a fall of the pitch of the voice can be sufficiently detected in the same manner.

Figure 12:
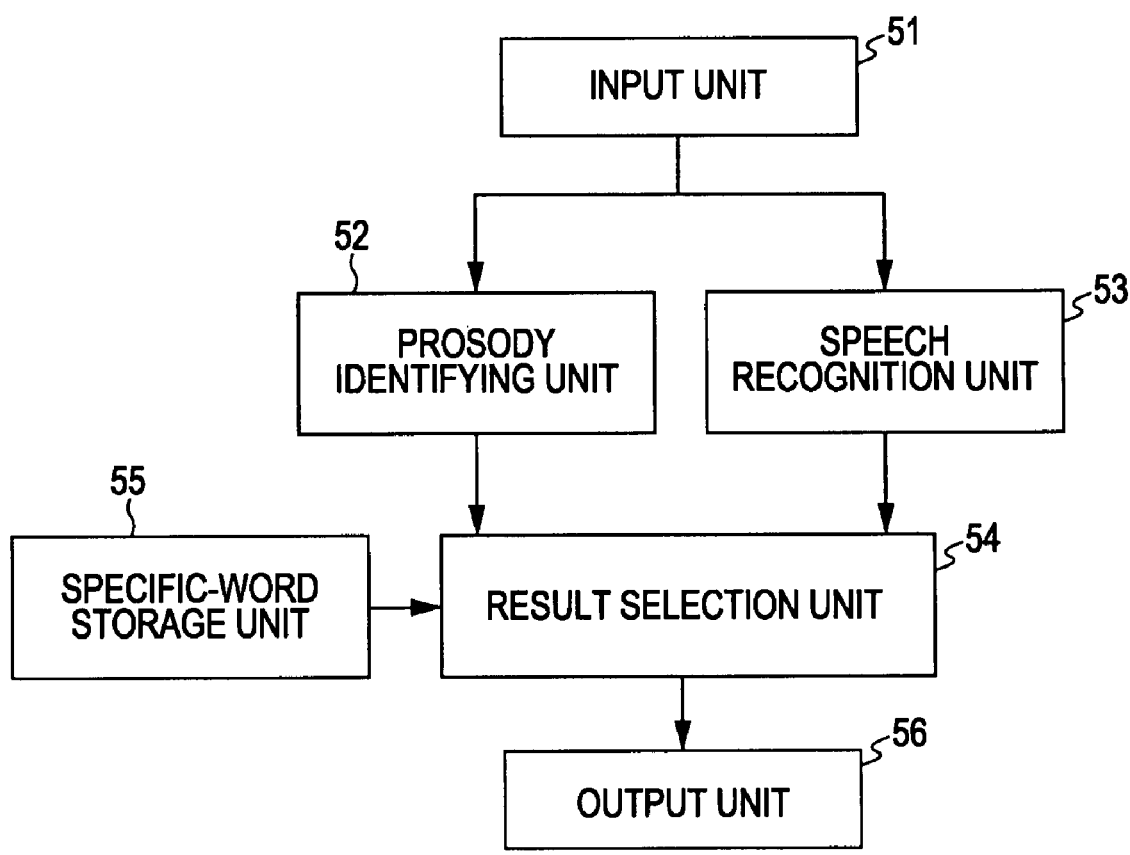
FIG. 12 is a block diagram illustrating an exemplary system in which a prosody identifying apparatus according to the embodiment is used together with a widely used speech recognition apparatus.

In this way, the internal process of the sound analyzing unit 12 shown in FIG. 12 is performed so that features used for identification are extracted. Thereafter, the features are delivered to the identification unit 13.

When a parameter indicating the features is delivered from the sound analyzing unit 12 to the identification unit 13, the time differences of the orders corresponding to the median points of the feature distributions at a given point of time t (a given analysis frame) are packed into one vector. More specifically, let a vector $O_t$ denote the information output from the sound analyzing unit 12. Then, the vector $O_t$ is expressed as follows:

$$O_t = (d_{i(1),t}, d_{i(2),t}, \ldots, d_{i(m),t}, \ldots, d_{i(M),t}) \quad (8)$$

where i(m) ($1 \leq m \leq M$) represents the order i of the entire feature distribution D={$D_i$}, that is, the set of the desired component vectors $D_i$ in the diagonal direction, and M represents the total number of the orders of the set {$D_i$}.

The identification unit 13 recognizes the unknown speech data using a parameter in the parameter storage unit 14, which is generated on the basis of the feature obtained by sound-analyzing learning sound data in advance. The recognition process performed by the identification unit 13 is the same as that in a widely used speech recognition technology, and therefore, description is not provided here.

As described above, according to the present embodiment, the prosody identifying apparatus that identifies prosody using prosodic features of an input voice identifies prosody using an amount of change in movement of a feature distribution obtained from the frequency characteristic of the input voice. In this way, the prosody identifying apparatus can detect prosody that is difficult to be detected in the known methods using a robust approach.

Usage Together with Widely Used Sound Recognition Apparatus

Figure 13:
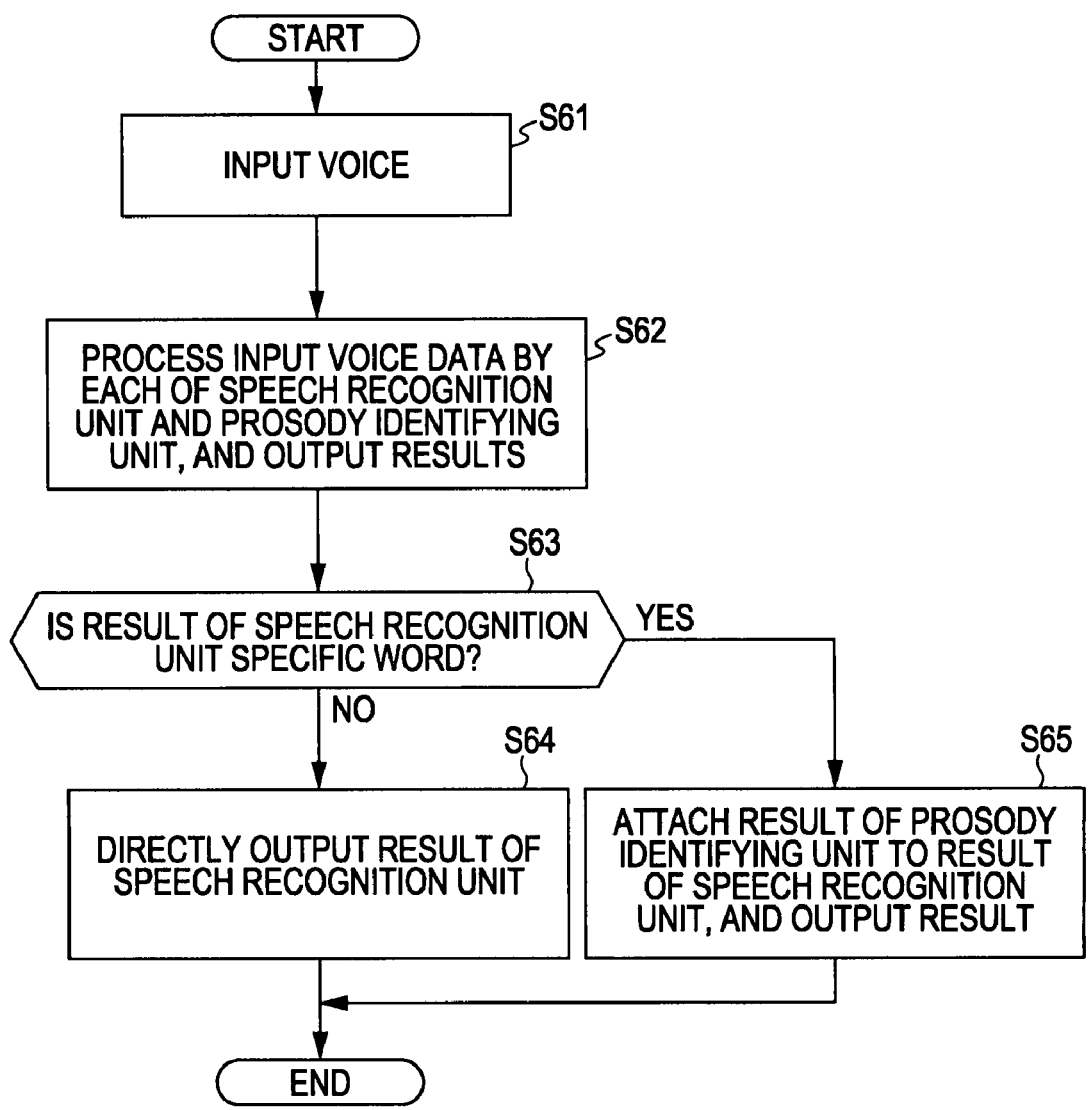
FIG. 13 is a flow chart illustrating the operation performed by the system shown in FIG. 12.

Usage of the prosody identifying apparatus according to the present embodiment together with a widely used speech recognition apparatus is described next. FIG. 12 illustrates a system configuration in which the prosody identifying apparatus according to the present embodiment is used together with a widely used speech recognition apparatus. FIG. 13 is a flow chart of a process performed in the system configuration.

As shown in FIG. 12, a voice is input to an input unit 51. The input unit 51 delivers the sound to a prosody identifying unit 52 according to the present embodiment and two processors of a widely used speech recognition unit 53. Each of the prosody identifying unit 52 and the speech recognition unit 53 processes the input sound data. As a result of a prosody identification process, the prosody identifying unit 52 outputs an utterance type (or an utterance intension of a user) identified on the basis of a prosody pattern of the input sound data. In addition, as a result of a speech recognition process, the speech recognition unit 53 outputs text information corresponding to the input sound data. The results of a prosody identification process and a speech recognition process are then delivered to a result selection unit 54.

The result selection unit 54 compares the result of a speech recognition process with each of specific words stored in a specific-word storage unit 55. If the result of a speech recognition process matches one of the specific words, the result of a prosody identification process is attached to or integrated with the result of a speech recognition process. Subsequently, this integrated result is output from an output unit 56 of the system. However, if the result of a speech recognition process does not match any specific word, only the result of a speech recognition process is output from the output unit 56 of the system.

For example, when a specific word is "UN" and the prosody identifying unit 52 identifies whether a word is "UN" that indicates an affirmative answer, "UUN" that indicates a negative answer, or "UN?" that indicates an interrogative, information about the type indicating an affirmative answer, a negative answer, or an interrogative (the user's intension) is attached to the result of a speech recognition process.

Such an operation is described next with reference to a flow chart shown in FIG. 13. At step S61, a voice is input. At step S62, the input voice data is processed by each of the prosody identifying unit 52 and the speech recognition unit 53, which are output the results of the processes. At step S63, it is determined whether the recognition result of the speech recognition unit 53 matches one of the above-described specific words. If it is determined to be NO (not match), the processing proceeds to step S64, where the recognition result of the speech recognition unit 53 is directly output. If, at step S63, it is determined to be YES (match), the processing proceeds to step S65, where the identification result of the prosody identifying unit 52 is attached to the recognition result of the speech recognition unit 53 and is output.

Alternatively, the result selection unit 54 may operate as follows. That is, the prosody identifying unit 52 identifies one of the following four utterance types: an "affirmative answer", a "negative answer", an "interrogative", and "others" that indicates a type other than the preceding three types. In such a case, the need for the specific-word storage unit 55 that accompanies with the result selection unit 54 can be eliminated. If the result of a prosody identification process is "others", only the result of a speech recognition process performed by the speech recognition unit 53 is output. If the result of a prosody identification process is one of the "affirmative answer", "negative answer", and "interrogative", the result of a prosody identification process performed by the prosody identifying unit 52 is attached to the result of a speech recognition process performed by the speech recognition unit 53 and is output.

It should be understood by those skilled in the art that various modifications, combinations, sub-combinations and alterations may occur depending on design requirements and other factors insofar as they are within the scope of the appended claims or the equivalents thereof.

What is claimed is:

1. A prosody identifying apparatus for identifying input speech on the basis of prosodic features of the input speech, comprising:
    sound analyzing means for acquiring an amount of change in movement of a feature distribution obtained from an autocorrelation matrix of the frequency characteristic of the input speech; and
    identifying means for recognizing the input speech on the basis of an output of the sound analyzing means.

2. The prosody identifying apparatus according to claim 1, wherein a time difference between median points of the feature distribution is utilized as the amount of change in movement of a feature distribution.

3. The prosody identifying apparatus according to claim 1, wherein desired components of the autocorrelation matrix of the frequency characteristic of the input speech in the diagonal direction is utilized as the feature distribution.

4. A method for identifying input speech on the basis of prosodic features of the input speech, comprising the steps of:
    acquiring an amount of change in movement of a feature distribution obtained from an autocorrelation matrix of the frequency characteristic of the input speech; and
    recognizing the input speech on the basis of an output of the step of acquiring an amount of change in movement of a feature distribution.

5. A speech recognition apparatus comprising:
    inputting means for inputting a speech signal;
    prosody identifying means for identifying prosody on the basis of an amount of change in movement of a feature distribution obtained from an autocorrelation matrix of a frequency characteristic of the input speech input to the inputting means; and
    speech recognizing means for performing speech recognition on the basis of features acquired by sound-analyzing the speech input to the inputting means; and
    selecting means for selecting whether to output an output of the speech recognizing means or to integrate the output from the prosody identifying means with an output of the speech recognizing means and output the integrated output, the selecting means outputting the selected output.

6. The speech recognition apparatus according to claim 5, wherein a time difference between median points of the feature distribution is utilized as the amount of change in movement of a feature distribution.

7. The speech recognition apparatus according to claim 5, wherein desired components of the autocorrelation matrix of the frequency characteristic of the input speech in the diagonal direction is utilized as the feature distribution.

8. A method for recognizing input speech, comprising the steps of:
    inputting a speech signal; identifying prosody on the basis of an amount of change in movement of a feature distribution obtained from an autocorrelation matrix of a frequency characteristic of the input speech input in the step of inputting a speech signal; and
    performing speech recognition on the basis of features acquired by sound-analyzing the speech input in the step of inputting a speech signal; and
    selecting whether to output an output of the step of identifying prosody or to integrate the output from the step of identifying prosody with an output from the step of performing speech recognition and output the integrated output, and outputting the selected output.

9. A prosody identifying apparatus for identifying input speech on the basis of prosodic features of the input speech, comprising:
    a sound analyzing section configured to acquire an amount of change in movement of a feature distribution obtained from an autocorrelation matrix of the frequency characteristic of the input speech; and
    an identifying section configured to recognize the input speech on the basis of an output of the sound analyzing section.

10. A speech recognition apparatus comprising:
    an inputting unit configured to input a speech signal;
    a prosody identifying unit configured to identify prosody on the basis of an amount of change in movement of a feature distribution obtained from an autocorrelation matrix of a frequency characteristic of the input speech input to the inputting unit; and
    a speech recognizing unit configured to perform speech recognition on the basis of features acquired by sound-analyzing the speech input to the inputting unit; and
    a selecting unit configured to select whether to output an output of the speech recognizing unit or to integrate the output from the prosody identifying unit with an output of the speech recognizing unit and output the integrated output, the selecting unit outputting the selected output.

* * * * *